(12) United States Patent
Ko

(10) Patent No.: US 10,678,477 B2
(45) Date of Patent: Jun. 9, 2020

(54) MEMORY MANAGEMENT METHOD, MEMORY CONTROL CIRCUIT UNIT AND MEMORY STORAGE APPARATUS

(71) Applicant: PHISON ELECTRONICS CORP., Miaoli (TW)

(72) Inventor: Bo-Cheng Ko, Miaoli County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 64 days.

(21) Appl. No.: 16/045,754

(22) Filed: Jul. 26, 2018

(65) Prior Publication Data

US 2019/0377514 A1 Dec. 12, 2019

(30) Foreign Application Priority Data

Jun. 6, 2018 (TW) .............................. 107119539 A

(51) Int. Cl.
*G06F 3/06* (2006.01)

(52) U.S. Cl.
CPC .......... *G06F 3/0659* (2013.01); *G06F 3/0604* (2013.01); *G06F 3/0652* (2013.01); *G06F 3/0679* (2013.01)

(58) Field of Classification Search
CPC ...... G06F 3/0604; G06F 3/0613; G06F 3/064; G06F 3/0652; G06F 3/0659; G06F 3/0679; G06F 12/0246

USPC ................................ 711/103, 170, 203, 209
See application file for complete search history.

(56) References Cited

U.S. PATENT DOCUMENTS

| 2005/0144516 | A1* | 6/2005 | Gonzalez | G06F 12/0246 714/6.13 |
| 2013/0159601 | A1* | 6/2013 | Lassa | G11C 29/883 711/103 |
| 2015/0339223 | A1* | 11/2015 | Matsudaira | G06F 12/0246 711/103 |
| 2018/0366210 | A1* | 12/2018 | Park | G11C 29/82 |
| 2019/0205043 | A1* | 7/2019 | Huang | G06F 3/0619 |

* cited by examiner

*Primary Examiner* — Gary J Portka
(74) *Attorney, Agent, or Firm* — JCIPRNET

(57) ABSTRACT

A memory management method for a rewritable non-volatile memory module, a memory control circuit unit and a memory storage apparatus are provided. The rewritable non-volatile memory module includes a plurality of super physical units, and the super physical units at least include a plurality of good super physical units and a plurality of partial good super physical units. The method includes: receiving a host write command; selecting a first super physical unit set according a number rate of the good super physical units and the partial good super physical units, and the first super physical unit set includes a plurality of first good super physical units and at least one first partial good super physical unit selected from the super physical units according to the number rate; and writing data into the good physical erasing units of the first super physical unit set, in response to the host write command.

15 Claims, 11 Drawing Sheets

MEMORY MANAGEMENT METHOD, MEMORY CONTROL CIRCUIT UNIT AND MEMORY STORAGE APPARATUS

CROSS-REFERENCE TO RELATED APPLICATION

This application claims the priority benefit of Taiwan application serial no. 107119539, filed on Jun. 6, 2018. The entirety of the above-mentioned patent application is hereby incorporated by reference herein and made a part of this specification.

BACKGROUND

Technical Field

The present invention relates to a memory managing method, a memory control circuit unit and a memory storage apparatus.

Description of Related Art

The markets of digital cameras, cellular phones, and MP3 players have expanded rapidly in recent years, resulting in escalated demand for storage media by consumers. The characteristics of data non-volatility, low power consumption, and compact size make a rewritable non-volatile memory module (e.g., a flash memory) ideal to be built in the portable multi-media devices as cited above.

In order to increase a maximum speed (i.e., a bandwidth) of the flash memory, most flash memories today have adopted a multi-channel design. Physical erasing units (blocks) that belong to different channels and different block planes can compose a virtual block (VB) (herein, also referred to as a super physical unit). However, owing to factors like manufacturing yield and service life (early bad/late bad), some of the physical erasing units in the super physical unit may become unavailable due to failures. Herein, the super physical unit containing the unavailable (bad) physical erasing unit is called a partial good super physical unit (non all good VB), and the super physical unit containing all the available physical erasing units is called a good super physical unit (all good VB).

In order to increase production yield and service life for the flash memory, the partial good super physical unit may also be used. However, when the partial good super physical unit is being used, some channels may become unavailable due to the bad physical erasing units in those channels. Consequently, those channels become idle so the bandwidth is wasted.

With reference to FIG. 1, FIG. 1 is a schematic diagram illustrating how a speed of the flash memory continues to drop in unit time. When the flash memory is poorly designed and the partial good super physical units containing the bad physical erasing unit are continuously being selected in unit time, the speed of the flash memory may continue to drop in unit time. Alternatively, performance issues like unstable speed would arise. These issues are unpleasant in many applications.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention provides a memory management method, a memory control circuit unit and a memory storage apparatus.

An exemplary embodiment provides a memory management method for a rewritable non-volatile memory module. The rewritable non-volatile memory module at least includes a plurality of super physical units including a plurality of good super physical units and a plurality of partial good super physical units. Each of the good super physical units includes a plurality of good physical erasing units, and each of the partial good super physical units includes at least one bad physical erasing unit. The memory managing method includes receiving a host write command; and selecting a first super physical unit set from the plurality of super physical units according to a number rate of the plurality of good super physical units and the plurality of partial good super physical units in the rewritable non-volatile memory module, wherein the first super physical unit set includes a plurality of first good super physical units and at least one first partial good super physical unit selected from the super physical units according to the number rate. The memory managing method further includes writing data into the good physical erasing units of the first super physical unit set, in response to the host write command.

An exemplary embodiment provides a memory control circuit unit for a rewritable non-volatile memory module having a plurality of super physical units. The super physical units at least include a plurality of good super physical units and a plurality of partial good super physical units. Each of the good super physical units includes a plurality of good physical erasing units, and each of the partial good super physical units includes at least one bad physical erasing unit. The memory control circuit unit includes a host interface, a memory interface and a memory management circuit. The host interface is configured to couple to a host system. The memory interface is configured to couple to the rewritable non-volatile memory module. The memory management circuit is coupled to the host interface and the memory interface. The memory management circuit is configured to receive a host write command, and select a first super physical unit set from the plurality of super physical units according to a number rate of the plurality of good super physical units and the plurality of partial good super physical units in the rewritable non-volatile memory module. The first super physical unit set includes a plurality of first good super physical units and at least one first partial good super physical unit selected from the super physical units according to the number rate. The memory management circuit is further configured to write data into the good physical erasing units of the first super physical unit set, in response to the host write command.

An exemplary embodiment provides a memory storage apparatus, which includes a connection interface unit, a rewritable non-volatile memory module and a memory control circuit unit. The connection interface unit is configured to couple to a host system. The rewritable non-volatile memory module includes a plurality of super physical units, and the super physical units at least include a plurality of good super physical units and a plurality of partial good super physical units. Each of the good super physical units includes a plurality of good physical erasing units, and each of the partial good super physical units includes at least one bad physical erasing unit. The memory control circuit unit is coupled to the connection interface unit and the rewritable non-volatile memory module. The memory control circuit unit is configured to receive a host write command, and select a first super physical unit set from the plurality of super physical units according to a number rate of the plurality of good super physical units and the plurality of partial good super physical units in the rewritable non-volatile memory module. The first super physical unit set includes a plurality of first good super physical units and at least one first partial good super physical unit selected from the super physical units according to the number rate. The memory control circuit unit is further configured to write data into the good physical erasing units of the first super physical unit set, in response to the host write command.

Based on the above, in view of the memory management method, the memory control circuit unit and the memory storage apparatus provided by the present invention, the super physical unit sets are selected for data writing by the host system according to the number rate of the good super physical units and the partial good super physical units. In this way, the probability of the bad physical erasing unit in the good super physical unit is averaged to stabilize the speed of the rewritable non-volatile memory module in unit time. Also, the physical erasing units of the rewritable non-volatile memory module being used may be averaged to increase the probability of wear leveling and thereby improve service life of the rewritable non-volatile memory module.

To make the above features and advantages of the disclosure more comprehensible, several embodiments accompanied with drawings are described in detail as follows.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
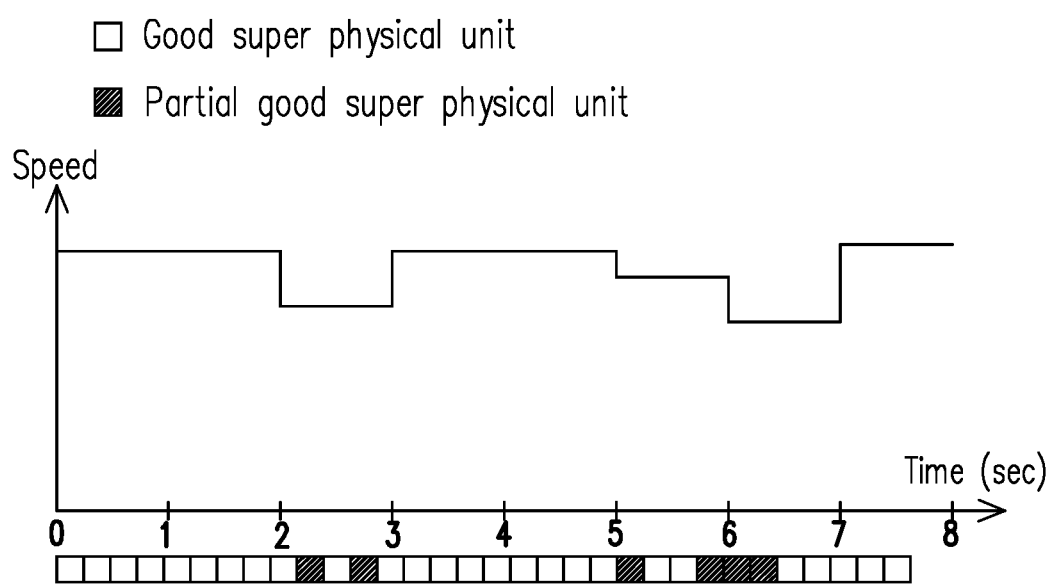
FIG. 1 is a schematic diagram illustrating how a speed of the flash memory continues to drop in unit time.

Reference will now be made in detail to the present preferred embodiments of the disclosure, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

In general, a memory storage apparatus (a.k.a. a memory storage system) includes a rewritable non-volatile memory module and a controller (a.k.a. a control circuit unit). The memory storage apparatus is usually configured together with a host system so the host system can write data into the memory storage apparatus or read data from the memory storage apparatus.

Figure 2:
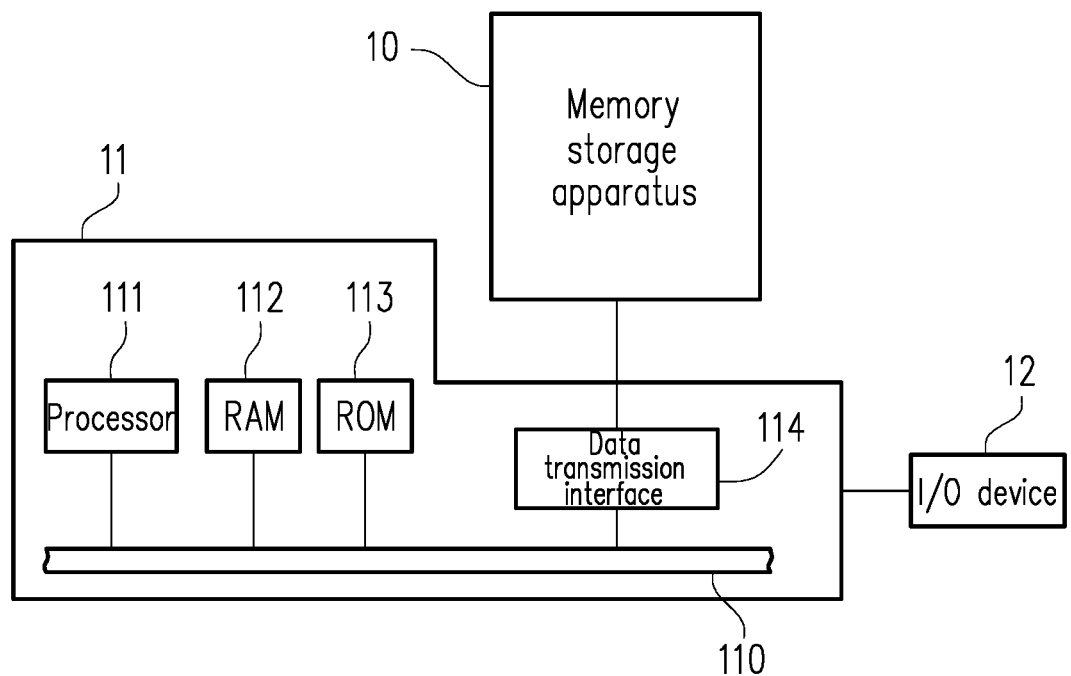
FIG. 2 is a schematic diagram illustrating a host system, a memory storage apparatus and an input/output (I/O) device according to an exemplary embodiment.
Figure 3:
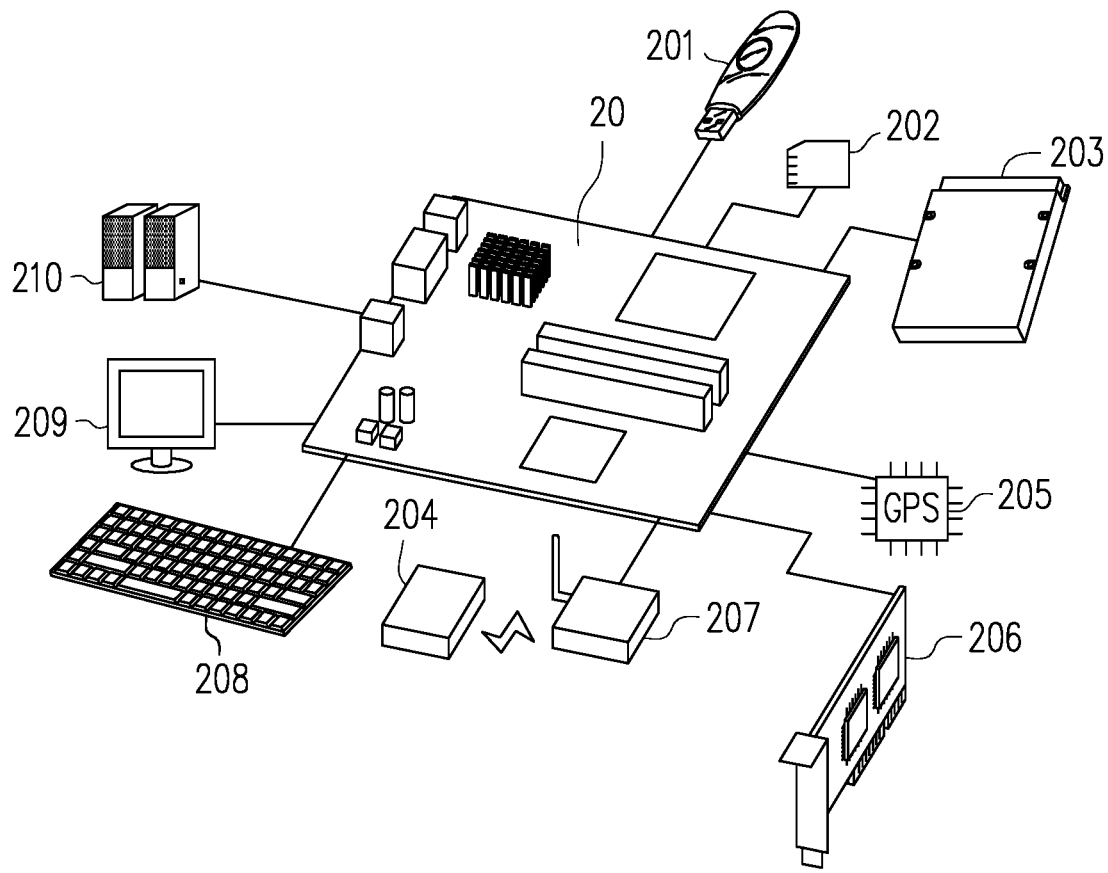
FIG. 3 is a schematic diagram illustrating a host system, a memory storage apparatus and an input/output (I/O) device according to another exemplary embodiment.

FIG. 2 is a schematic diagram illustrating a host system, a memory storage apparatus and an input/output (I/O) device according to an exemplary embodiment, and FIG. 3 is a schematic diagram illustrating a host system, a memory storage apparatus and an input/output (I/O) device according to another exemplary embodiment.

Referring to FIG. 2 and FIG. 3, a host system 11 generally includes a processor 111, a RAM (random access memory) 112, a ROM (read only memory) 113 and a data transmission interface 114. The processor 111, the RAM 112, the ROM 113 and the data transmission interface 114 are coupled to a system bus 110.

In this exemplary embodiment, the host system 11 is coupled to a memory storage apparatus 10 through the data transmission interface 114. For example, the host system 11 can write data into the memory storage apparatus 10 or read data from the memory storage apparatus 10 via the data transmission interface 114. Further, the host system 11 is coupled to an I/O device 12 via the system bus 110. For example, the host system 11 can transmit output signals to the I/O device 12 or receive input signals from the I/O device 12 via the system bus 110.

In this exemplary embodiment, the processor 111, the RAM 112, the ROM 113 and the data transmission interface 114 may be disposed on a main board 20 of the host system 11. The number of the data transmission interfaces 114 may be one or more. Through the data transmission interface 114, the main board 20 may be coupled to the memory storage apparatus 10 in a wired manner or a wireless manner. The memory storage apparatus 10 may be, for example, a flash drive 201, a memory card 202, a SSD (Solid State Drive) 203 or a wireless memory storage apparatus 204. The wireless memory storage apparatus 204 may be, for example, a memory storage apparatus based on various wireless communication technologies, such as a NFC (Near Field Communication Storage) memory storage apparatus, a WiFi (Wireless Fidelity) memory storage apparatus, a Bluetooth memory storage apparatus, a BLE (Bluetooth low energy) memory storage apparatus (e.g., iBeacon). Further, the main board 20 may also be coupled to various I/O devices including a GPS (Global Positioning System) module 205, a network interface card 206, a wireless transmission device 207, a keyboard 208, a monitor 209 and a speaker 210 through the system bus 110. For example, in an exemplary embodiment, the main board 20 can access the wireless memory storage apparatus 204 via the wireless transmission device 207.

Figure 4:
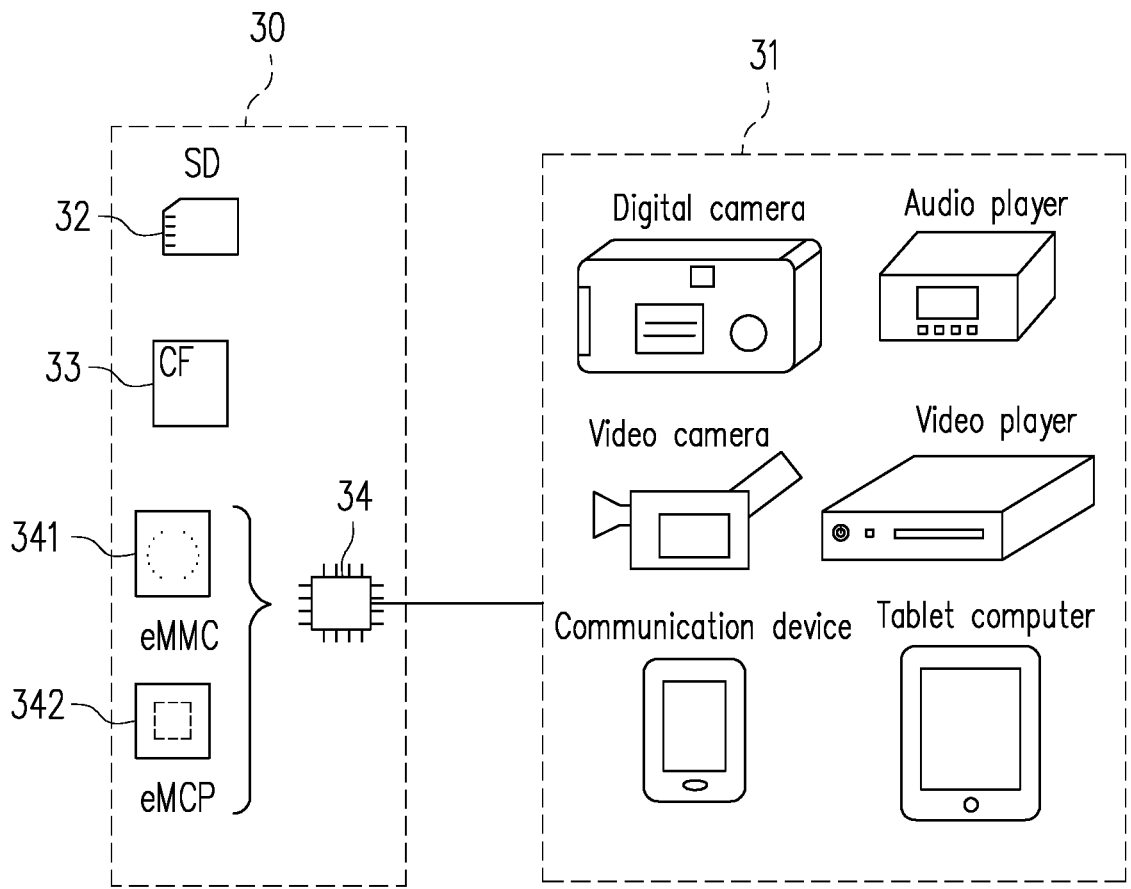
FIG. 4 is a schematic diagram illustrating a host system and a memory storage apparatus according to another exemplary embodiment.

In an exemplary embodiment, aforementioned host system may be any system capable of substantially cooperating with the memory storage apparatus for storing data. Although the host system is illustrated as a computer system in foregoing exemplary embodiment, the disclosure is not limited thereto. FIG. 3 is a schematic diagram illustrating a host system and a memory storage apparatus according to another exemplary embodiment. Referring to FIG. 4, in another exemplary embodiment, a host system 31 may also be a system including a digital camera, a video camera, a communication device, an audio player, a video player or a tablet computer, whereas a memory storage apparatus 30 may be various non-volatile memory storage apparatuses used by the host system, such as a SD card 32, a CF card 33 or an embedded storage device 34. The embedded storage device 34 includes various embedded storage devices capable of directly coupling a memory module onto a substrate of the host system, such as an eMMC (embedded MMC) 341 and/or an eMCP (embedded Multi Chip Package) 342.

Figure 5:
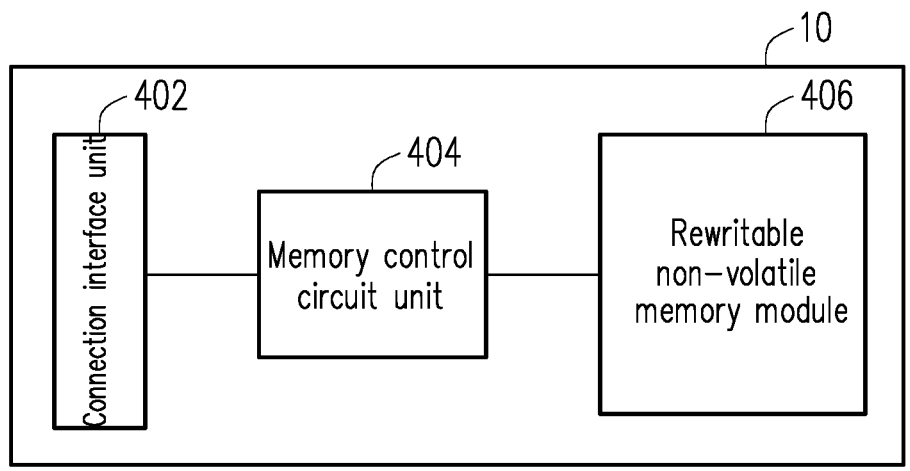
FIG. 5 is a schematic block diagram illustrating a host system and a memory storage apparatus according to an exemplary embodiment.

FIG. 5 is a schematic block diagram illustrating a host system and a memory storage apparatus according to one exemplary embodiment.

Referring to FIG. 5, the memory storage apparatus 10 includes a connection interface unit 402, a memory control circuit unit 404 and a rewritable non-volatile memory module 406.

In this exemplary embodiment, the connection interface unit 402 is compatible with a Secure Digital (SD) interface standard. Nevertheless, it should be understood that the present invention is not limited to the above. The connection interface unit 402 may also be compatible to a SATA (Serial Advanced Technology Attachment) standard, a PATA (Parallel Advanced Technology Attachment) standard, an IEEE (Institute of Electrical and Electronic Engineers) 1394 standard, a PCI Express (Peripheral Component Interconnect Express) interface standard, a USB (Universal Serial Bus) standard, a UHS-I (Ultra High Speed-I) interface standard, a UHS-II (Ultra High Speed-II) interface standard, a MS (Memory Stick) interface standard, a Multi-Chip Package interface standard, a MMC (Multi Media Card) interface standard, an eMMC (Embedded Multimedia Card) interface standard, a UFS (Universal Flash Storage) interface standard, an eMCP (embedded Multi Chip Package) interface standard, a CF (Compact Flash) interface standard, an IDE (Integrated Device Electronics) interface standard or other suitable standards. In this exemplary embodiment, the connection interface unit 402 and the memory control circuit unit 404 may be packaged into one chip, or the connection interface unit 402 is distributed outside of a chip containing the memory control circuit unit.

The memory control circuit unit 404 is configured to execute a plurality of logic gates or control commands which are implemented in a hardware form or in a firmware form and perform operations of writing, reading or erasing data in the rewritable non-volatile memory storage module 406 according to the commands of the host system 11.

The rewritable non-volatile memory module 406 is coupled to the memory control circuit unit 404 and configured to store data written from the host system 11. The rewritable non-volatile memory storage module 406 includes physical erasing units (a.k.a. physical blocks) 410(0) to 410(N). For example, the physical erasing units 410(0) to 410(N) may belong to the same memory die or belong to different memory dies. Each physical erasing unit has a plurality of physical pages (a.k.a. physical programming units), and the physical pages belonging to the same physical erasing unit may be written separately and erased simultaneously. Nevertheless, it should be understood that the present invention is not limited to the above. Each physical erasing unit may be composed of 64 pages, 256 physical pages or any number of the physical pages.

More specifically, the physical erasing unit is a minimum unit for erasing. Namely, each physical erasing unit contains the least number of memory cells to be erased together. The physical programming unit is the minimum unit for programming. That is, the physical programming unit is the minimum unit for writing data. Each physical programming unit usually includes a data bit area and a redundant bit area. The data bit area having multiple physical access addresses is used to store user data, and the redundant bit area is used to store system data (e.g., control information and error checking and correcting code). In this exemplary embodiment, each data bit area of the physical programming unit contains 8 physical access addresses, and the size of each physical access address is 512 bytes. However, in other exemplary embodiments, the data bit area may also include more or less of the physical access addresses, and an amount and a size of the physical access addresses are not limited in the present invention. For example, in an exemplary embodiment, the physical erasing unit is a physical block, and the physical programming unit is a physical page or a physical sector, but the present invention is not limited thereto.

In this exemplary embodiment, the rewritable non-volatile memory module 406 is a SLC (Single Level Cell) NAND flash memory module (i.e., a flash memory module capable of storing one data bit in one memory cell). However, the present invention is not limited in this regard. The rewritable non-volatile memory module 406 may also be a MLC (Multi Level Cell) NAND flash memory module, (i.e., a flash memory module capable of storing two data bits in one memory cell), a TLC (Trinary Level Cell) NAND flash memory module (i.e., a flash memory module capable of storing three data bits in one memory cell), other flash memory modules or any memory module having the same features.

Figure 6:
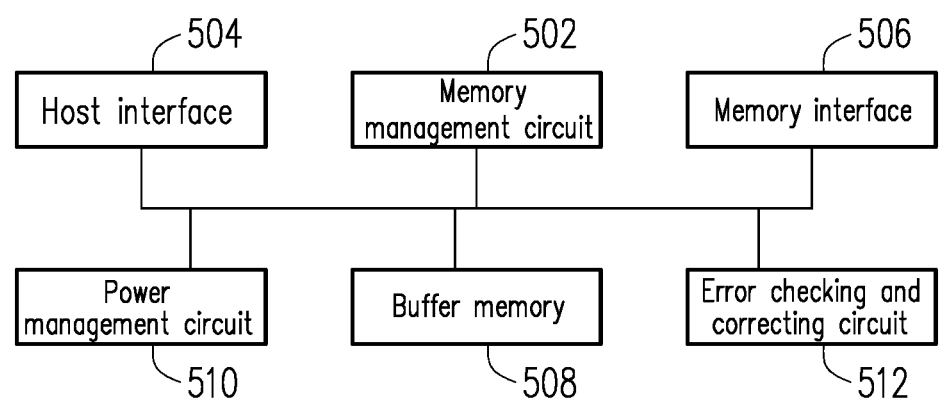
FIG. 6 is a schematic block diagram illustrating a memory control circuit unit according to an exemplary embodiment.

FIG. 6 is a schematic block diagram illustrating a memory control circuit unit according to an exemplary embodiment.

Referring to FIG. 6, the memory control circuit unit 404 includes a memory management circuit 502, a host interface 504 and a memory interface 506.

The memory management circuit 502 is configured to control overall operations of the memory control circuit unit 404. Specifically, the memory management circuit 502 has a plurality of control commands. When the memory storage apparatus 10 operates, the control commands are executed to perform various operations such as data writing, data reading and data erasing.

In this exemplary embodiment, the control commands of the memory management circuit 502 are implemented in a firmware form. For instance, the memory management circuit 502 has a microprocessor unit (not illustrated) and a ROM (not illustrated), and the control commands are burned into the ROM. When the memory storage apparatus 10 operates, the control commands are executed by the microprocessor to perform operations of writing, reading or erasing data.

In another exemplary embodiment of the present invention, the control commands of the memory management circuit 502 may also be stored, in form of program codes, into a specific area (e.g., a system area in the memory module exclusively for storing the system data) of the rewritable non-volatile memory module 406. In addition, the memory management circuit 502 has a microprocessor unit (not illustrated), a ROM (not illustrated) and a RAM (not illustrated). In particular, the ROM has a boot code, which is executed by the microprocessor unit to load the control commands stored in the rewritable non-volatile memory module 406 to the RAM of the memory management circuit 502 when the memory control circuit unit 404 is enabled. Then, the control commands are executed by the microprocessor unit to perform operations of writing, reading or erasing data.

Further, in another exemplary embodiment of the present invention, the control commands of the memory management circuit 502 may also be implemented in a hardware form. For example, the memory management circuit 502 includes a microprocessor, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microprocessor. The memory management circuit is configured to manage the physical erasing units of the rewritable non-volatile memory module 406; the memory writing circuit is configured to give a write command to the rewritable non-volatile memory module 406 in order to write data into the rewritable non-volatile memory module 406; the memory reading circuit is configured to give a read command to the rewritable non-volatile memory module 406 in order to read data from the rewritable non-volatile memory module 406; the memory erasing circuit is configured to give an erase command to the rewritable non-volatile memory module 406 in order to erase data from the rewritable non-volatile memory module 406; and the data processing circuit is configured to process both the data to be written into the rewritable non-volatile memory module 406 and the data read from the rewritable non-volatile memory module 406.

The host interface 504 is coupled to the memory management circuit 502 and configured to couple to the connection interface unit 402, so as to receive and identify commands and data sent from the host system 11. In other words, the commands and data transmitted by the host system 11 are transmitted to the memory management circuit 502 via the host interface 504. In this exemplary embodiment, the host interface 504 is compatible with the SATA standard. Nevertheless, it should be understood that the disclosure is not limited in this regard. The host interface 504 may also be compatible with the PATA standard, the IEEE 1394 standard, the PCI Express standard, the USB standard, the UHS-I interface standard, the UHS-II interface standard, the SD standard, the MS standard, the MMC standard, the CF standard, the IDE standard, or other suitable standards for data transmission.

The memory interface 506 is coupled to the memory management circuit 502 and configured to access the rewritable non-volatile memory module 406. In other words, data to be written into the rewritable non-volatile memory module 406 is converted into a format acceptable by the rewritable non-volatile memory module 406 via the memory interface 506.

In an exemplary embodiment, the memory control circuit unit 404 further includes a buffer memory 508, a power management circuit 510 and an error checking and correcting circuit 512.

The buffer memory 508 is coupled to the memory management circuit 502 and configured to temporarily store data and commands from the host system 11 or data from the rewritable non-volatile memory module 406.

The power management unit 510 is coupled to the memory management circuit 502 and configured to control a power of the memory storage apparatus 10.

The error checking and correcting circuit 512 is coupled to the memory management circuit 502 and configured to execute an error checking and correcting procedure to ensure the data integrity. Specifically, when the memory management circuit 502 receives a write command from the host system 11, the error checking and correcting circuit 512 generates an ECC code (Error Checking and Correcting Code) for the data corresponding to the write command, and the memory management circuit 502 writes the data and the ECC code corresponding to the write command into the rewritable non-volatile memory module 406. Later, when reading the data from the rewritable non-volatile memory module 406, the memory management circuit 502 also reads the error checking and correcting code corresponding to the data, and the error checking and correcting circuit 512 executes the error checking and correcting procedure for the read data according to the error checking and correcting code.

In this exemplary embodiment, a low density parity code (LDPC) is implemented by the error checking and correcting circuit 512. However, in another exemplary embodiment, the error checking and correcting circuit 512 may also be implemented by encoding/decoding algorithms including a BCH code, a convolutional code, a turbo code, a bit flipping, etc.

Specifically, the memory management circuit 202 generates an error correction code frame (ECC frame) according to the received data and the corresponding error checking and correcting code (a.k.a. an error correction code) and writes the ECC frame into the rewritable non-volatile memory module 406. Then, when the memory management circuit 502 reads data from the rewritable non-volatile memory module 406, the error checking and correcting circuit 512 can verify the correctness of the read data according to the error correction code in the ECC frame.

In the following description, the operations executed by the memory management circuit 502, the host interface 504, the memory interface 506, the buffer memory 508, the power management circuit 510 and the error checking and correcting circuit 512 may also be referred to as being executed by the memory control circuit unit 404.

Figure 7:
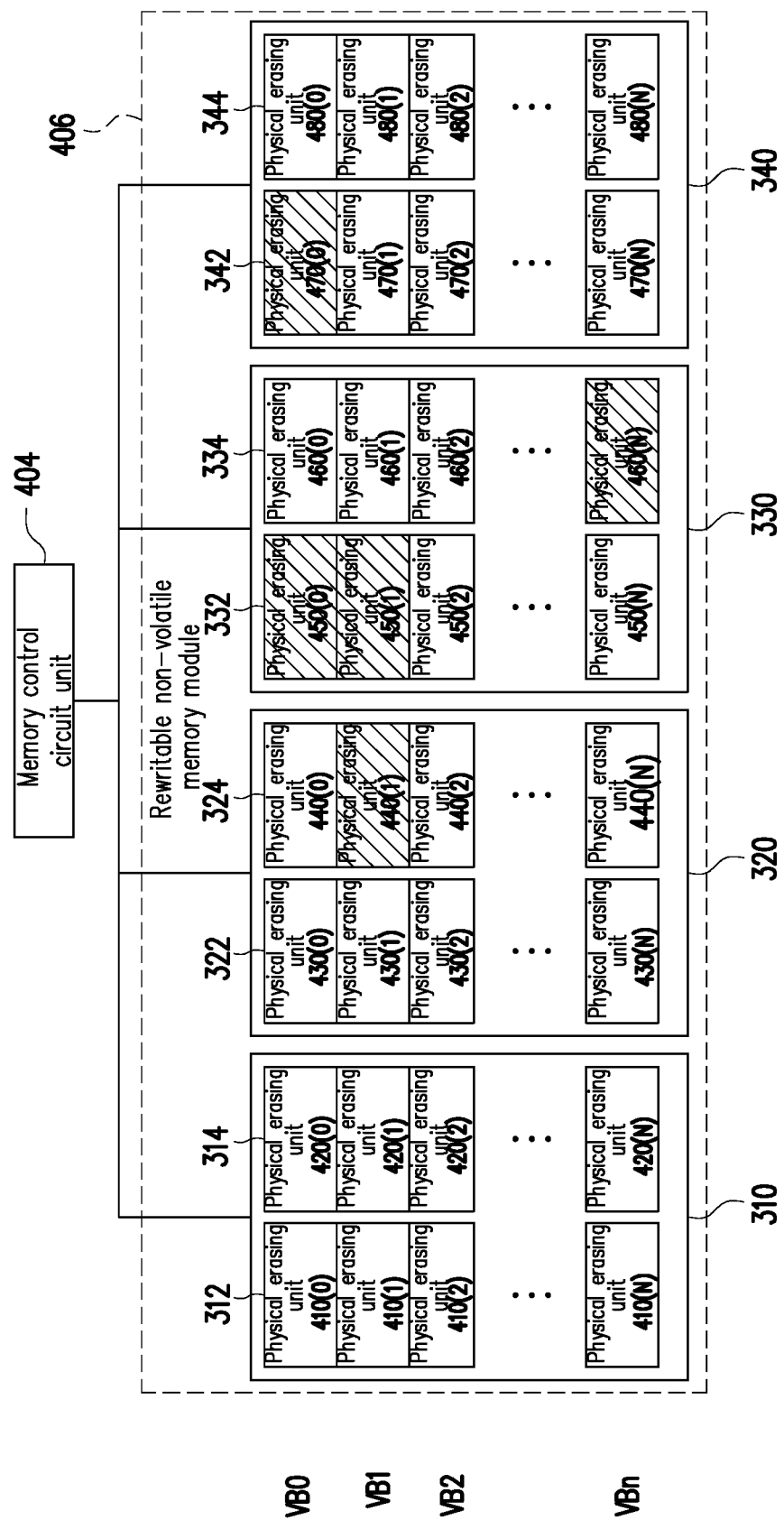
FIG. 7 is a schematic diagram illustrating an example for managing super physical units according to an exemplary embodiment.

FIG. 7 is a schematic diagram illustrating an example for managing super physical units according to an exemplary embodiment.

It should be understood that terms, such as "divide" and the like, are logical concepts which describe operations in the physical erasing units of the rewritable non-volatile memory module 406. That is, the physical erasing units of the rewritable non-volatile memory module are logically operated, but actual positions of the physical units of the rewritable non-volatile memory module are not changed.

With reference to FIG. 7, the rewritable non-volatile memory module 406 includes a plurality of super physical units composed of a plurality of physical erasing units respectively belonging to a channel 310, a channel 320, a channel 330 and a channel 340 (hereinafter, referred to as the channels 310 to 340) and respectively belonging to a first block plane 312, a first block plane 322, a first block plane 332, a first block plane 342 (hereinafter, referred to as the first block planes 312 to 342), a second block plane 314, a second block plane 324, a second block plane 334, and a second block plane 344 (hereinafter, referred to as the second block planes 314 to 344). For example, the channels 310 to 340 are different channels, and the first block planes 312 to 342 and the second block planes 314 to 344 are different block planes, respectively.

Here, the physical erasing units 410(0) to 410(N) and the physical erasing units 420(0) to 420(N) belong to the first block plane 312 and the second block plane 314 of the channel 310, respectively. The physical erasing units 430(0) to 430(N) and the physical erasing units 440(0) to 440(N) belong to the first block plane 322 and the second block plane 324 of the channel 320, respectively. The physical erasing units 450(0) to 450(N) and the physical erasing units 460(0) to 460(N) belong to the first block plane 332 and the second block plane 334 of the channel 330, respectively. The physical erasing units 470(0) to 470(N) and the physical erasing units 480(0) to 480(N) belong to the first block plane 342 and the second block plane 344 of the channel 340, respectively.

Referring back to FIG. 7, a plurality of physical erasing units that belong to the different channels and the different block planes can compose a virtual block (VB) (herein, also referred to as a super physical unit). For example, the physical erasing unit 410(0), the physical erasing unit 420(0), the physical erasing unit 430(0), the physical erasing unit 440(0), the physical erasing unit 450(0), the physical erasing unit 460(0), the physical erasing unit 470(0) and the physical erasing unit 480(0) (hereinafter, referred to as the physical erasing units 410(0) to 480(0)) can compose a super physical unit VB0. Similarly, the physical erasing units 410(1) to 480(1) can compose a super physical unit VB1. The physical erasing units 410(2) to 480(2) can compose a super physical unit VB2. By analogy, the physical erasing units 410(N) to 480(N) can compose a super physical unit VBn.

In an exemplary embodiment, the super physical unit VB0 includes a bad physical erasing unit 450(0) and a bad physical erasing unit 470(0); the super physical unit VB1 includes a bad physical erasing unit 440(1) and a bad physical erasing unit 450(1); and the super physical unit VBn includes a bad physical erasing unit 460(N). In other words, each of the super physical unit VB0, the super physical unit VB1 and the super physical unit VBn includes at least one bad physical erasing unit and has only a part of the physical erasing units being available. Therefore, each of the super physical unit VB0, the super physical unit VB1 and the super physical unit VBn may be regarded as a partial good super physical unit. On the other hand, since all of the physical erasing units 410(2) to 480(2) included in the super physical unit VB2 are available good physical erasing units, the super physical unit VB2 may be regarded as a good super physical unit.

Figure 8:
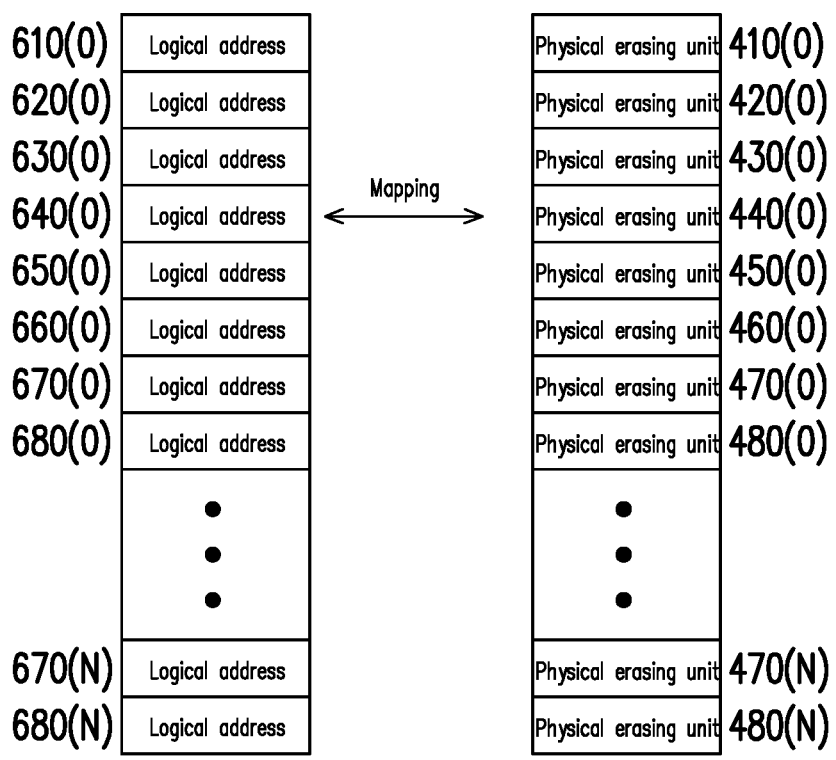
FIG. 8 is a schematic diagram illustrating an example for mapping physical erasing units in the super physical unit to logical addresses according to an exemplary embodiment.
Figure 9:
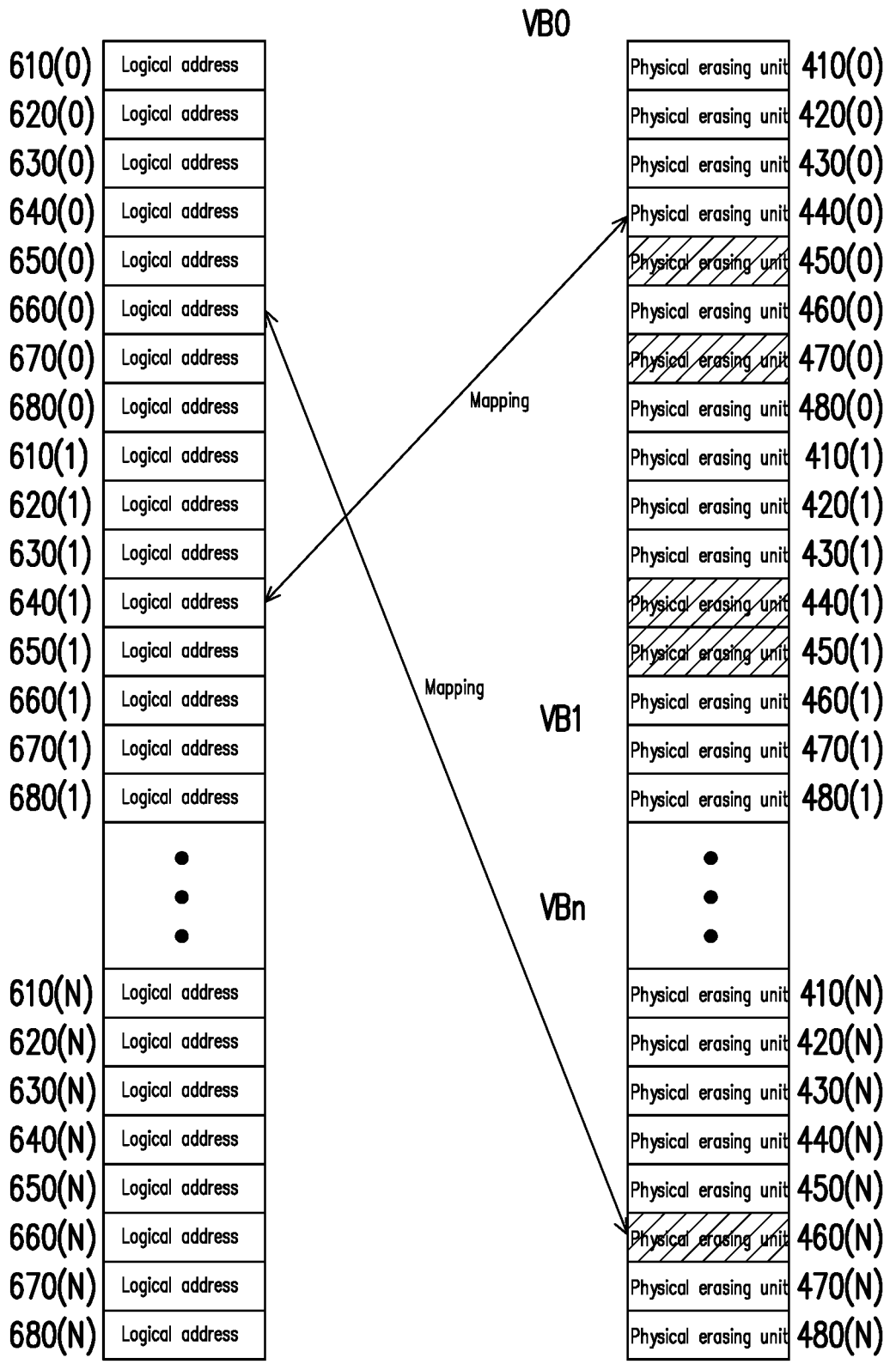
FIG. 9 is a schematic diagram illustrating an example for re-mapping physical erasing units in the super physical unit to logical addresses according to an exemplary embodiment.

FIG. 8 is a schematic diagram illustrating an example for mapping physical erasing units in the super physical unit to logical addresses according to an exemplary embodiment, and FIG. 9 is a schematic diagram illustrating an example for re-mapping physical erasing units in the super physical unit to logical addresses according to an exemplary embodiment.

The following description refers to FIG. 8. In an exemplary embodiment, the memory management circuit 502 would assign logical addresses 610(0) to 680(N) to the host system 11 to be mapped to the physical erasing units 410(0) to 480(N) for data accessing on the physical erasing units stored with data. In particular, the host system 11 accesses the data in the physical erasing units 410(0) to 480(N) through the logic addresses 610(0) to 680(N). Further, the memory management circuit 502 would create a logical-physical mapping table to record a mapping relation between the logical addresses and the physical erasing units. The logical-physical mapping table may also record, for example, various logical and physical correspondence relations such as a mapping relation between the logical addresses and the physical programming units, a mapping relation between the logical programming units and the physical programming units and/or a mapping relation between the logical programming units and the physical erasing units, which are not particularly limited by the present invention.

In general, before the memory storage apparatus 10 leaves the factory, manufacturers will perform a formatting operation for the memory storage apparatus 10 using a Mass Production tool (MP tool) so as to perform an initialization.

With reference to FIG. 9, during the formatting operation, the memory storage apparatus 10 would at least divide the super physical units VB0 to VBn into a bad super physical unit, the partial good super physical unit and the good super physical unit using re-mapping (i.e., remap), so as to arrange as many good super physical units as possible to thereby extend service life of the memory storage apparatus 10. In an exemplary embodiment, the memory control circuit unit 404 selects a first partial good super physical unit (e.g., the partial good super physical unit VB0) and a second partial good super physical unit (e.g., the partial good super physical unit VB1) from the super physical units VB0 to VBn. For example, the partial good super physical unit VB0 includes the bad physical erasing unit 450(0) and the bad physical erasing unit 470(0), and the partial good super physical unit VB1 includes the bad physical erasing unit 440(1) and the bad physical erasing unit 450(1). The memory control circuit unit 404 maps the good physical erasing unit 440(0) of the partial good super physical unit VB0 to the logical address 640(1) of the bad physical erasing unit 440(1) of the partial good super physical unit VB1. The bad physical erasing unit 440(1) of the partial good super physical unit VB1 would no longer be mapped to the logical address, and the good physical erasing unit 440(0) of the partial good super physical unit VB0 and the bad physical erasing unit 440(1) of the partial good super physical unit VB1 belong to the same channel 320 and belong to the same block plane 324. In addition, the memory control circuit unit 404 also updates the logical-physical mapping table.

Similarly, the memory control circuit unit 404 selects a third partial good super physical unit (e.g., the partial good super physical unit VBn) from the super physical units VB0 to VBn, and then the memory control circuit unit 404 maps the good physical erasing unit 460(0) of the first partial good super physical unit (e.g., the partial good super physical unit VB0) to the logical address 660(N) of the bad physical erasing unit 460(N) of the partial good super physical unit VBn. The bad physical erasing unit 460(N) of the partial good super physical unit VBn would no longer be mapped to the logical address, and the good physical erasing unit 460(0) of the partial good super physical unit VB0 and the bad physical erasing unit 460(N) of the partial good super physical unit VBn belong to the same channel 330 and belong to the same block plane 334. In addition, the memory control circuit unit 404 also updates the logical-physical mapping table.

In the exemplary embodiment above, the memory control circuit unit 404 have the bad physical erasing units (e.g., the bad physical erasing unit 440(1) and the bad physical erasing unit 460(N)) collectively included in the super physical unit VB0. Also, the memory control circuit unit 404 would at least divide the super physical units VB0 to VBn into the bad super physical unit, the partial good super physical unit and the good super physical unit according to a ratio of a number of the bad physical erasing units and a total number of the physical erasing units in each super physical unit among the super physical units VB0 to VBn.

In general, when the ratio of the number of the bad physical erasing units in one super physical unit and the total number of the physical erasing units in one super physical unit exceeds one quarter, it can be determined that this super physical unit is the bad super physical unit. In other words, this super physical unit is unavailable. If one super physical unit at least includes one bad physical erasing unit and yet the number of the bad physical erasing units is less than one quarter of the total number of physical erasing units, it can be determined that this super physical unit is the partial good super physical unit. If one super physical unit does not include the bad physical erasing unit, it can be determined that this super physical unit is the good super physical unit.

In addition, the memory control circuit unit 404 would make a mark on each of the bad super physical unit, the partial good super physical unit and the good super physical unit, and update a super physical unit queue list. Here, the super physical unit queue list is used to record information representing the super physical units, which may be, for example, marks, numbers, identification values or the logical addresses corresponding to the physical erasing units of the super physical units. In other words, after the remapping in the formatting operations is executed by the memory storage apparatus 10, the information is correspondingly recorded in the updated super physical unit queue list. In an exemplary embodiment, the memory control circuit unit 404 can sequentially record information of the bad super physical unit, the partial good super physical unit and the good super physical unit into the super physical unit queue list for the memory control circuit unit 404 to access.

In an exemplary embodiment, the memory control circuit unit 404 selects a plurality of super physical unit sets, such as a first super physical unit set, a second super physical unit set and so on, according to the super physical unit queue list, counts a number of the super physical units and a number of the at least one partial good super physical unit in each of the super physical unit sets, and dynamically updates a number rate according to the number of the good super physical units and the number of the partial good super physical units. In this way, the first super physical unit set can include the good super physical units and the partial good super physical units selected according to the number rate, and the second super physical unit set can include the good super physical units and the partial good super physical units selected according to the updated number rate. The above process is repeatedly performed until the plurality of the super physical unit sets are selected.

For instance, it is assumed that, the rewritable non-volatile memory module 406 includes 1000 super physical units, including 980 good super physical units and 20 partial good super physical units. The memory control circuit unit 404 selects the first super physical unit set from the super physical units VB0 to VBn according to the number rate of the good super physical units and the partial good super physical units in the rewritable non-volatile memory module 406. In other words, it can be known that the number rate of the good super physical units and the partial good super physical units in the rewritable non-volatile memory module 406 is 49:1 in this example. In this case, the memory control circuit unit 404 would select 49 good super physical units from the good super physical units of the super physical units VB0 to VBn and then select 1 partial good super physical unit from the partial good super physical units of the super physical units VB0 to VBn. Those 49 good super physical units and 1 partial good super physical unit compose the first super physical unit set (e.g., the super physical units VB0 to VB49, in which the super physical unit VB0 to VB48 are the good super physical units and the super physical unit VB49 is the partial good super physical unit). Next, the memory control circuit unit 404 continues to select the second super physical unit set from remaining super physical units. The memory control circuit unit 404 would dynamically update the number rate according to the number of good super physical units and the number of partial good super physical units in the remaining super physical units excluding the first super physical unit set in the rewritable non-volatile memory module 406, and select the second super physical unit set from the remaining super physical units excluding the first super physical unit set in the rewritable non-volatile memory module 406. In other words, at the time, the number of the good super physical units and the number of the partial good super physical units in the remaining super physical units excluding the first super physical unit set are respectively 931 and 19, and the updated number rate is 49:1. Subsequently, the memory control circuit unit 404 continues to select 49 good super physical units from the good super physical units of the remaining super physical units VB50 to VBn and then select 1 partial good super physical unit from the partial good super physical units of the super physical units VB50 to VBn. Similarly, those 49 good super physical units and 1 partial good super physical unit compose the second super physical unit set (e.g., the super physical units VB50 to VB99, in which the super physical unit VB50 to VB98 are the good super physical units and the super physical unit VB99 is the partial good super physical unit). By analogy, the memory control circuit unit 404 selects multiple super physical unit sets from the super physical units VB0 to VBn, and sequentially writes data of the host system into the good physical erasing units of the selected super physical unit sets. The reason why the number rate is dynamically updated is that the good super physical units in the rewritable non-volatile memory module 406 might become the partial good super physical unit or even become the bad super physical unit after programming operations. Therefore, in the process of writing data, the number of the good super physical units would gradually decrease, and the number of the partial good super physical units would gradually increase.

Figure 10:
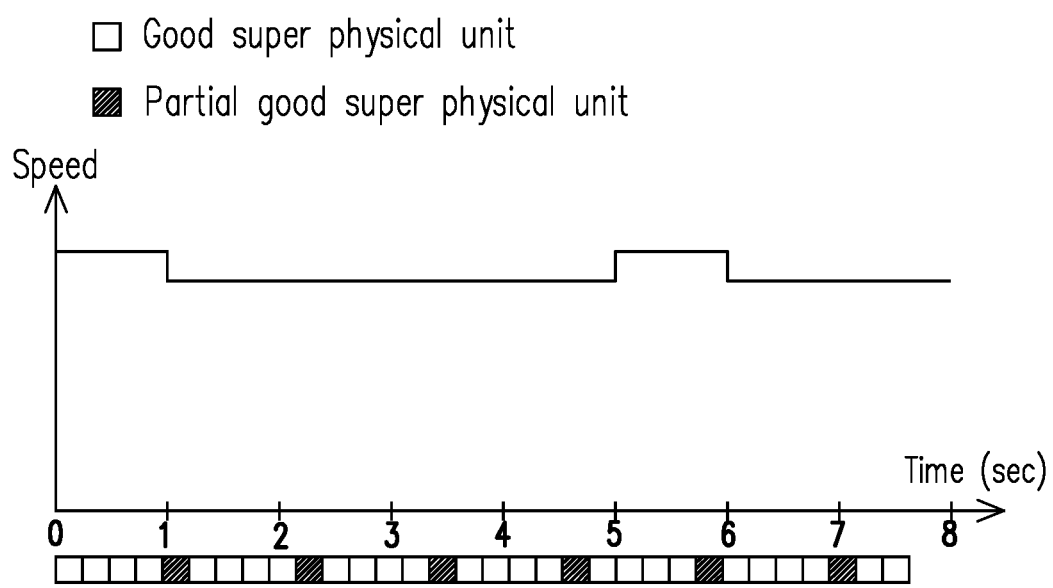
FIG. 10 is a schematic diagram illustrating how a speed of the flash memory is stabilized in unit time.

FIG. 10 is a schematic diagram illustrating how a speed of the flash memory is stabilized in unit time in an exemplary embodiment.

With reference to FIG. 10, the memory control circuit unit 404 selects a plurality of super physical unit sets according to a fixed ratio (the number rate) of the good super physical units and the partial good super physical units in the super physical units VB0 to VBn. Accordingly, this can prevent too many partial good super physical units from being used at the same time. Therefore, the physical erasing units in the rewritable non-volatile memory module 406 being used may be averaged so an access speed may be stabilized.

It is noted that, although the exemplary embodiment of the present invention is described by using the rewritable non-volatile memory module 406 that includes 4 channels and 2 block planes as an example, the present invention is not limited thereto. In other exemplary embodiments, the rewritable non-volatile memory module 406 may also include more or less channels or more or less block planes.

Figure 11:
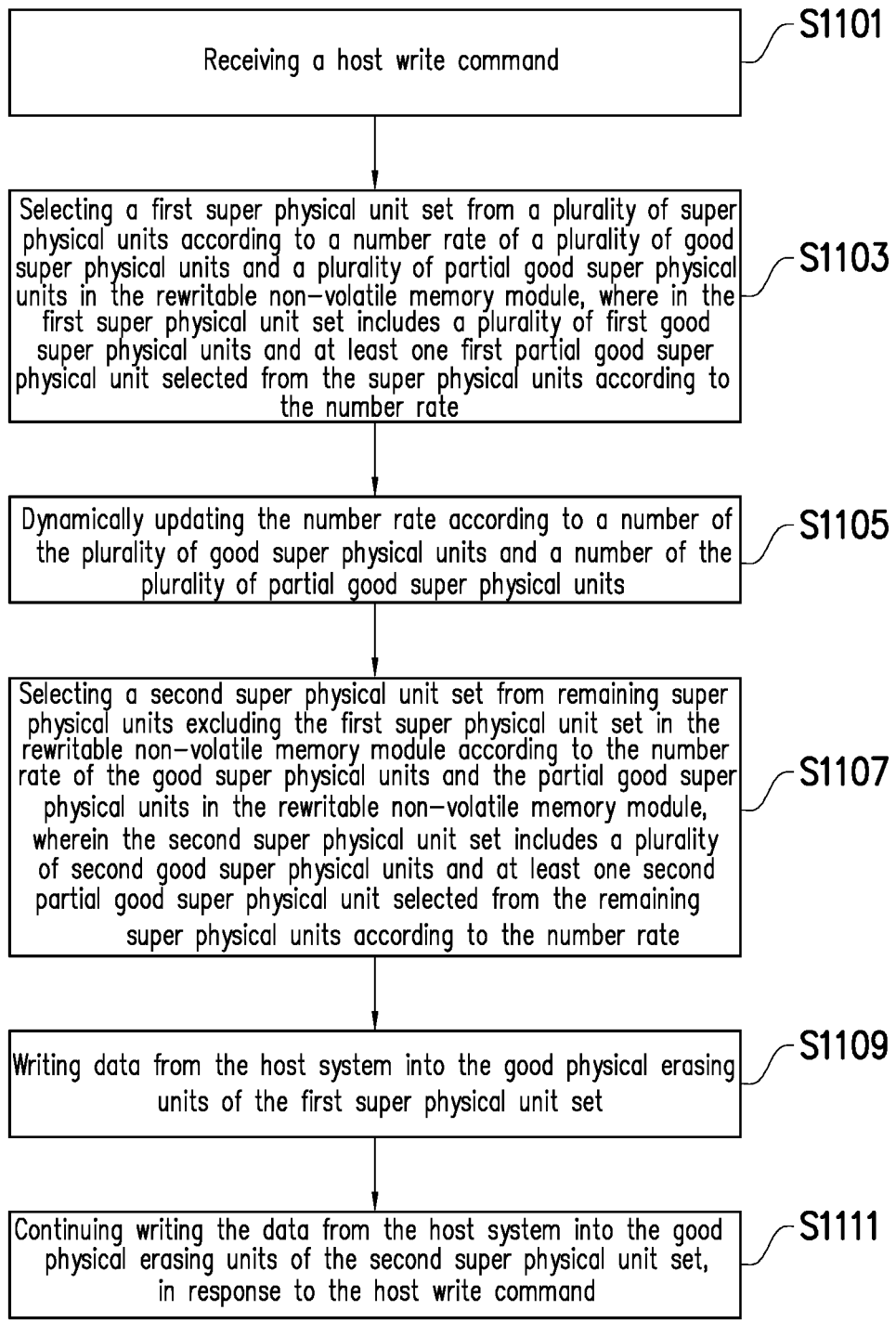
FIG. 11 is a flowchart illustrating a memory managing method according to an exemplary embodiment.

FIG. 11 is a flowchart illustrating a memory managing method according to an exemplary embodiment.

With reference to FIG. 11, in step S1101, the memory control circuit unit 404 receives a host write command.

In step S1103, the memory control circuit unit 404 selects a first super physical unit set from a plurality of super physical units according to a number rate of a plurality of good super physical units and a plurality of partial good super physical units in the rewritable non-volatile memory module 406, wherein the first super physical unit set includes a plurality of first good super physical units and at least one first partial good super physical unit selected from the super physical units according to the number rate.

In step S1105, the memory control circuit unit 404 dynamically updates the number rate according to a number of the plurality of good super physical units and a number of the plurality of partial good super physical units.

In step S1107, the memory control circuit unit 404 selects a second super physical unit set from remaining super physical units excluding the first super physical unit set in the rewritable non-volatile memory module 406 according to the number rate of the good super physical units and the partial good super physical units in the rewritable non-volatile memory module 406, wherein the second super physical unit set includes a plurality of second good super physical units and at least one second partial good super physical unit selected from the remaining super physical units according to the number rate.

In step S1109, the memory control circuit unit 404 writes data from the host system into the good physical erasing units of the first super physical unit set.

In step S1111, the memory control circuit unit 404 continues writing the data from the host system into the good physical erasing units of the second super physical unit set, in response to the host write command.

Figure 12:
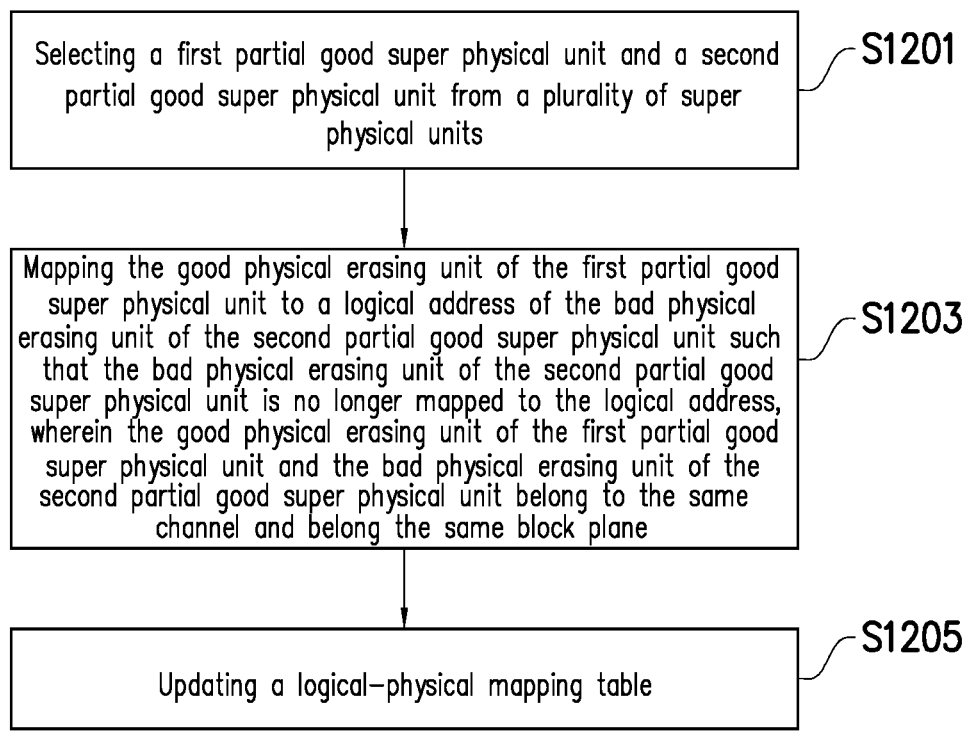
FIG. 12 is a flowchart illustrating how the physical erasing unit are re-mapped to the logical addresses according to an exemplary embodiment.

FIG. 12 is a flowchart illustrating how the physical erasing unit are re-mapped to the logical addresses according to an exemplary embodiment.

With reference to FIG. 12, in step S1201, the memory control circuit unit 404 selects a first partial good super physical unit and a second partial good super physical unit from a plurality of super physical units.

In step S1203, the memory control circuit unit 404 maps the good physical erasing unit of the first partial good super physical unit to a logical address of the bad physical erasing unit of the second partial good super physical unit such that the bad physical erasing unit of the second partial good super physical unit is no longer mapped to the logical address.

Here, the good physical erasing unit of the first partial good super physical unit and the bad physical erasing unit of the second partial good super physical unit belong to the same channel and belong the same block plane.

In step S1205, the memory control circuit unit 404 updates a logical-physical mapping table.

Figure 13:
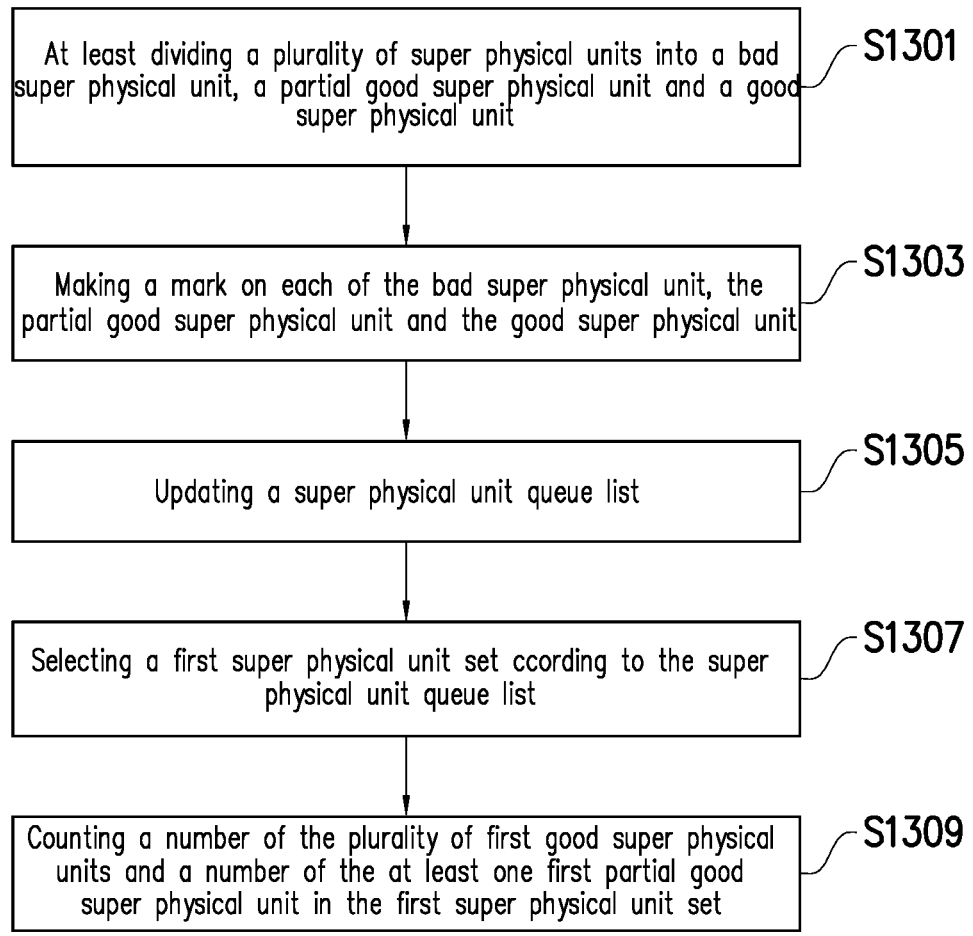
FIG. 13 is a flowchart illustrating a memory management method according to another exemplary embodiment.

FIG. 13 is a flowchart illustrating a memory management method according to another exemplary embodiment.

With reference to FIG. 13, in step S1301, the memory control circuit unit 404 at least divide a plurality of super physical units into a bad super physical unit, a partial good super physical unit and a good super physical unit.

In step S1303, the memory control circuit unit 404 makes a mark on each of the bad super physical unit, the partial good super physical unit and the good super physical unit.

In step S1305, the memory control circuit unit 404 updates a super physical unit queue list.

In step S1307, the memory control circuit unit 404 selects a first super physical unit set according to the super physical unit queue list.

In step S1309, the memory control circuit unit 404 counts a number of the plurality of first good super physical units and a number of the at least one first partial good super physical unit in the first super physical unit set.

To sum up, in view of the memory management method, the memory control circuit unit and the memory storage apparatus provided by the present invention, the super physical unit sets are selected for data writing by the host system according to the number rate of the good super physical units and the partial good super physical units. In this way, the probability of the bad physical erasing unit in the good super physical unit is averaged to stabilize the speed of the rewritable non-volatile memory module in unit time. Also, the physical erasing units of the rewritable non-volatile memory module being used may be averaged to increase the probability of wear leveling and thereby improve service life of the rewritable non-volatile memory module.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

It will be apparent to those skilled in the art that various modifications and variations can be made to the structure of the present invention without departing from the scope or spirit of the present invention. In view of the foregoing, it is intended that the present invention cover modifications and variations of this invention provided they fall within the scope of the following claims and their equivalents.

What is claimed is:

1. A memory management method for a rewritable non-volatile memory module comprising a plurality of super physical units, the plurality of super physical units at least comprising a plurality of good super physical units and a plurality of partial good super physical units, wherein each of the good super physical units comprises a plurality of good physical erasing units, each of the partial good super physical units comprises at least one bad physical erasing unit, and the memory management method comprises:

receiving a host write command;

selecting a first super physical unit set from the plurality of super physical units according to a number rate of the plurality of good super physical units and the plurality of partial good super physical units in the rewritable non-volatile memory module, wherein the first super physical unit set comprises a plurality of first good super physical units and at least one first partial good super physical unit selected from the plurality of super physical units according to the number rate;

writing data into the good physical erasing units of the first super physical unit set, in response to the host write command; and dynamically updating the number rate according to a number of the plurality of good super physical units and a number of the plurality of partial good super physical units.

2. The memory management method of claim 1, further comprising:

selecting a second super physical unit set from remaining super physical units excluding the first super physical unit set in the rewritable non-volatile memory module according to the number rate of the good super physical units and the partial good super physical units in the rewritable non-volatile memory module, wherein the second super physical unit set comprises a plurality of second good super physical units and at least one second partial good super physical unit selected from the remaining super physical units according to the number rate; and continuing writing the data into the good physical erasing units of the second super physical unit set.

3. The memory management method of claim 1, further comprising:

at least dividing the plurality of super physical units into a bad super physical unit, a partial good super physical unit and a good super physical unit;

making a mark on each of the bad super physical unit, the partial good super physical unit and the good super physical unit; and updating a super physical unit queue list.

4. The memory management method of claim 3, further comprising:

at least dividing the plurality of super physical units into the bad super physical unit, the partial good super physical unit and the good super physical unit according to a ratio of a number of the bad physical erasing units in each of the super physical units and a total number of physical erasing units in each of the super physical units.

5. The memory management method of claim 3, wherein the step of selecting the first super physical unit set from the plurality of super physical units according to the number rate of the plurality of good super physical units and the plurality of partial good super physical units in the rewritable non-volatile memory module comprises:

selecting the first super physical unit set according to the super physical unit queue list; and counting a number of the plurality of first good super physical units and a number of the at least one first partial good super physical unit in the first super physical unit set.

6. A memory control circuit unit for a rewritable non-volatile memory module comprising a plurality of super physical units, the plurality of super physical units at least comprising a plurality of good super physical units and a plurality of partial good super physical units, wherein each of the good super physical units comprises a plurality of good physical erasing units, each of the partial good super physical units comprises at least one bad physical erasing unit, and the memory control circuit unit comprises:

a host interface, configured to couple to a host system;

a memory interface, configured to couple to the rewritable non-volatile memory module; and a memory management circuit, coupled to the host interface and the memory interface;

wherein the memory management circuit is configured to receive a host write command, and the memory management circuit is configured to select a first super physical unit set from the plurality of super physical units according to a number rate of the plurality of good super physical units and the plurality of partial good super physical units in the rewritable non-volatile memory module, wherein the first super physical unit set comprises a plurality of first good super physical units and at least one first partial good super physical unit selected from the plurality of super physical units according to the number rate, wherein the memory management circuit is further configured to write data corresponding to the host write command into the good physical erasing units of the first super physical unit set, in response to the host write command, wherein the memory management circuit is further configured to dynamically update the number rate according to a number of the plurality of good super physical units and a number of the plurality of partial good super physical units.

7. The memory control circuit unit of claim 6, wherein the memory management circuit is further configured to select a second super physical unit set from remaining super physical units excluding the first super physical unit set in the rewritable non-volatile memory module according to the number rate of the good super physical units and the partial good super physical units in the rewritable non-volatile memory module, wherein the second super physical unit set comprises a plurality of second good super physical units and at least one second partial good super physical unit selected from the remaining super physical units according to the number rate, the memory management circuit is further configured to continue writing the data into the good physical erasing units of the second super physical unit set.

8. The memory control circuit unit of claim 6, wherein the memory management circuit is further configured to at least divide the plurality of super physical units into a bad super physical unit, a partial good super physical unit and a good super physical unit, the memory management circuit is further configured to make a mark on each of the bad super physical unit, the partial good super physical unit and the good super physical unit, and the memory management circuit is further configured to update a super physical unit queue list.

9. The memory control circuit unit of claim 8, wherein the memory management circuit is further configured to at least divide the plurality of super physical units into the bad super physical unit, the partial good super physical unit and the good super physical unit according to a ratio of a number of the bad physical erasing units in each of the super physical units and a total number of physical erasing units in each of the super physical units.

10. The memory control circuit unit of claim 8, wherein in the operation where the memory management circuit is further configured to select the first super physical unit set from the plurality of super physical units according to the number rate of the plurality of good super physical units and the plurality of partial good super physical units in the rewritable non-volatile memory module, the memory management circuit is further configured to select the first super physical unit set according to the super physical unit queue list, and the memory management circuit is further configured to count a number of the plurality of first good super physical units and a number of the at least one first partial good super physical unit in the first super physical unit set.

11. A memory storage apparatus, comprising:

a connection interface unit, configured to couple to a host system;

a rewritable non-volatile memory module, comprising a plurality of super physical units, the plurality of super physical units at least comprising a plurality of good super physical units and a plurality of partial good super physical units, wherein each of the good super physical units comprises a plurality of good physical erasing units, and each of the partial good super physical units comprises at least one bad physical erasing unit; and a memory control circuit unit, coupled to the connection interface unit and the rewritable non-volatile memory module, wherein the memory control circuit unit is configured to receive a host write command, and the memory control circuit unit is configured to select a first super physical unit set from the plurality of super physical units according to a number rate of the plurality of good super physical units and the plurality of partial good super physical units in the rewritable non-volatile memory module, wherein the first super physical unit set comprises a plurality of first good super physical units and at least one first partial good super physical unit selected from the plurality of super physical units according to the number rate, wherein the memory control circuit unit is configured to write data corresponding to the host write command into the good physical erasing units of the first super physical unit set, in response to the host write command, wherein the memory control circuit unit is configured to dynamically update the number rate according to a number of the plurality of good super physical units and a number of the plurality of partial good super physical units.

12. The memory storage apparatus of claim 11, wherein the memory control circuit unit is further configured to select a second super physical unit set from remaining super physical units excluding the first super physical unit set in the rewritable non-volatile memory module according to the number rate of the good super physical units and the partial good super physical units in the rewritable non-volatile memory module, wherein the second super physical unit set comprises a plurality of second good super physical units and at least one second partial good super physical unit selected from the remaining super physical units according to the number rate, the memory control circuit unit is further configured to continue writing the data into the good physical blocks units of the second super physical unit set.

13. The memory storage apparatus of claim 11, wherein the memory control circuit unit is further configured to at least divide the plurality of super physical units into a bad super physical unit, a partial good super physical unit and a good super physical unit, the memory control circuit unit is further configured to make a mark on each of the bad super physical unit, the partial good super physical unit and the good super physical unit, and the memory control circuit unit is further configured to update a super physical unit queue list.

14. The memory storage apparatus of claim 13, wherein the memory control circuit unit is further configured to at least divide the plurality of super physical units into the bad super physical unit, the partial good super physical unit and the good super physical unit according to a ratio of a number of the bad physical erasing units in each of the super physical units and a total number of physical erasing units in each of the super physical units.

15. The memory storage apparatus of claim 13, wherein in the operation where the memory control circuit unit is further configured to select the first super physical unit set from the plurality of super physical units according to the number rate of the plurality of good super physical units and the plurality of partial good super physical units in the rewritable non-volatile memory module, the memory control circuit unit is further configured to select the first super physical unit set according to the super physical unit queue list, and the memory control circuit unit is further configured to count a number of the plurality of first good super physical units and a number of the at least one first partial good super physical unit in the first super physical unit set.

* * * * *